US011834170B2

United States Patent
Elbaz et al.

(10) Patent No.: US 11,834,170 B2
(45) Date of Patent: Dec. 5, 2023

(54) MORPHING AIRCRAFT SKIN WITH EMBEDDED VISCOUS PEELING NETWORK

(71) Applicant: TECHNION RESEARCH AND DEVELOPMENT FOUNDATION LIMITED, Haifa (IL)

(72) Inventors: Shai Elbaz, Atlit (IL); Lior Salem, Be'er Sheva (IL); Benny Gamus, Ma'alot (IL); Yizhar Or, Hoshaya (IL); Amir Gat, Haifa (IL); Ofek Peretz, Haifa (IL)

(73) Assignee: TECHNION RESEARCH AND DEVELOPMENT FOUNDATION LIMITED, Haifa (IL)

( * ) Notice: Subject to any disclaimer, the term of this patent is extended or adjusted under 35 U.S.C. 154(b) by 174 days.

(21) Appl. No.: 17/422,539

(22) PCT Filed: Jan. 15, 2020

(86) PCT No.: PCT/IL2020/050067
§ 371 (c)(1),
(2) Date: Jul. 13, 2021

(87) PCT Pub. No.: WO2020/148765
PCT Pub. Date: Jul. 23, 2020

(65) Prior Publication Data
US 2022/0097821 A1     Mar. 31, 2022

Related U.S. Application Data

(60) Provisional application No. 62/792,448, filed on Jan. 15, 2019.

(51) Int. Cl.
*B64C 3/26*     (2006.01)
*B64C 3/48*     (2006.01)
*B64C 3/44*     (2006.01)

(52) U.S. Cl.
CPC ............ *B64C 3/48* (2013.01); *B64C 3/26* (2013.01); *B64C 2003/445* (2013.01)

(58) Field of Classification Search
CPC ........ B64C 2003/445; B64C 3/26; B64C 3/44
See application file for complete search history.

(56) References Cited

U.S. PATENT DOCUMENTS 3,129,908 A    4/1964   Harper
6,015,115 A *  1/2000   Dorsett ............... B64C 3/46
                                          244/219

(Continued)

FOREIGN PATENT DOCUMENTS

| FR | 2907421 A1 | 4/2008 |
| JP | 2010173646 A | 8/2010 |
| WO | 2016079743 A1 | 5/2016 |

OTHER PUBLICATIONS

Supplementary European Search Report in EP Application No. 20741518.3, dated Aug. 17, 2022, 5 pages.

(Continued)

*Primary Examiner* — Brady W Frazier
*Assistant Examiner* — Shanna Danielle Glover
(74) *Attorney, Agent, or Firm* — BROWDY AND NEIMARK, P.L.L.C.

(57) ABSTRACT

An airfoil surface skin, comprising a network of a solid material, embedded in a base of deformable solid material. Fluid pressure applied to the interface between the network and the surrounding embedding material, opens an internal network of channels by viscous peeling of the surrounding solid from the network. The network is offset from the centerline the surround material, such that pressure driven viscous flow through the narrow channels generates two types of deformation of the skin—an in-plane elongation and a curvature of the skin plane itself. The shape of the internal solid core element and its material, and the material (Continued)

of the encompassing solid are chosen to achieve a desired integral structural rigidity. The injected fluid pressure determines the extent of extension and bending. Use of this skin enables shape amending airfoils having reduced drag compared with similar airfoils having conventional flap mechanisms.

20 Claims, 6 Drawing Sheets

(56) References Cited

U.S. PATENT DOCUMENTS

| | | | |
|---|---|---|---|
| 6,199,796 B1 | 3/2001 | Reinhard | |
| 6,347,769 B1 | 2/2002 | To et al. | |
| 7,384,016 B2 | 6/2008 | Kota et al. | |
| 8,342,451 B1 * | 1/2013 | Lutke | B64C 3/385 244/123.1 |
| 8,418,967 B2 * | 4/2013 | Hemmelgarn | B64C 3/48 416/240 |
| 8,882,049 B2 * | 11/2014 | Shams | B64C 23/04 244/203 |
| 10,006,444 B2 | 6/2018 | Ting | |
| 10,654,557 B2 * | 5/2020 | Xi | B64C 5/14 |
| 2005/0151015 A1 * | 7/2005 | Cagle | B64C 3/26 244/121 |
| 2006/0145031 A1 | 7/2006 | Ishikawa et al. | |
| 2015/0129715 A1 * | 5/2015 | Madsen | B64C 9/02 244/99.8 |
| 2017/0259907 A1 * | 9/2017 | Arata | B64C 3/48 |

OTHER PUBLICATIONS

International Search Report and Written Opinion in PCT/IL2020/050067, dated Apr. 6, 2020.
B. Jennet et al. "Digital Morphing Wing: Active Wing Shaping Concept Using Composite Lattice-Based Cellular Structures", Soft Robotics 4(1), pp. 33-48 (Nov. 1, 2017).

* cited by examiner

MORPHING AIRCRAFT SKIN WITH EMBEDDED VISCOUS PEELING NETWORK

FIELD

The present disclosure relates to the field of morphing aircraft skins, and especially to such skins which can be deformed by the use of internally embedded channel networks, to which applied pressure generates peeling between the embedded network and the skin material.

BACKGROUND

Current aircraft wings are designed to passively limit wing deformation due to aerodynamic loads and active modification of wing aerodynamic properties necessitates creation of geometrical discontinuities, such as are used in flaps, ailerons, and other surfaces requiring shape adjustments. Wing deformation requires a sufficiently rigid, and thus heavier, wing structure. In addition, the geometric discontinuities associated with presently used flight control surfaces increase drag and fuel consumption. Shape-morphing wings may reduce required wing stiffness, and thus wing weight, by actively eliminating deflection due to aerodynamic forces, by creating an opposite deformation of the wing. Continuous distributed shape-morphing of the wing camber may eliminate the additional drag and fuel consumption associated with geometrical discontinuities of flight control surfaces. Some current approaches to shape morphing wings include mechanical actuation mechanisms which are placed within the internal cavity of the wing, which is constructed of compliant frame sections, such that the mechanical actuators can adjust the wing form. Such a solution has been described in U.S. Pat. No. 7,384,016 for "Adaptive Compliant Wing and Rotor System" assigned to FlexSys Inc. However, weight is of primary importance in an aircraft, since any weight required by actuating mechanisms or construction configurations, results in a reduced payload for the aircraft.

An alternative approach, called MADCAT (Mission Adaptive Digital Composite Aerostructure Technologies) has been proposed by the NASA's Ames Research Center, in cooperation with MIT and other US University research teams, as described in the article by B. Jennet et al, entitled "Digital morphing wing: active wing shaping concept using composite lattice-based cellular structures" and published in Soft Robotics, 4(1), pp. 33-48. This method involves a wing structure constructed from building-block units made of advanced carbon fiber composite materials. These building blocks are assembled into a lattice, or arrangement of repeating structures; the way that they are arranged determines how they flex. The wing also features actuators and computers that make it morph and twist to achieve the desired wing shape during flight. However, in this technology, the entire volume of the wing appears to comprise the shape-changing mechanism. In modern aircraft design, internal wing space is extremely valuable, and is typically reserved for fuel and systems which must lie in close proximity to the external lifting surface. In addition, the NASA-MIT design can mainly generate spanwise twist of the wing axis having limited three-dimensional deformation patterns.

The disclosures of each of the publications mentioned in this section and in other sections of the specification, are hereby incorporated by reference, each in its entirety.

SUMMARY

The present disclosure attempts to provide a morphing flight surface that overcomes at least some of the disadvantages of prior art methods and structures. The present disclosure describes solutions and methods for producing load bearing aircraft surfaces, in which the elastic properties of the skin itself are changed, as opposed to the above mentioned prior art methods, in which the structure supporting the skin is deformed, while the skin itself is inert. In the presently disclosed solutions, the structure of the airfoil surface and its actuation mechanism are common, in that the skin incorporates an internal actuation mechanism to modify the elasticity, curvature and size of the skin, such that the local cross-section of an aircraft lifting or stabilizing surface can be changed using that internal actuation mechanism. The most common lifting surface in an aircraft is the wing, but the currently disclosed technology can be extended to any lifting or stabilizing surface of an aircraft, such as flaps, airbrakes, ailerons, rudders, elevators, horizontal and vertical stabilizers, wing tips and winglets. The internal actuation mechanism is manufactured as an inherent part of the skin and therefore forms a composite skin material. The actuation of the skin is done via fluid pressure and thus a predesigned network can generate a desired deformation, either actuated in a time-dependent fashion or to achieve steady deformation. The skin may also be supported by an inner truss structure as in conventional aircraft designs, but without the need for any mechanical actuating mechanisms. The use of a morphing skin generates a seamless wing surface, without any joint mechanisms to spoil the aerodynamic profile of the wing when deformed.

The present disclosure describes an aircraft flight surface skin, in which a shaped network of a solid material, with arbitrary cross-section, called the nucleus or core, is embedded in an encompassing base solid material which forms the bulk and face of the skin. The core may be of any suitable shape, but a conveniently compact shape is that of a serpentine or zig-zag network, and a long total length. Hereinafter, the term "serpentine" is used to describe the shape of the core geometry suitable for use in such systems, whether a sharp angled serpentine or zig-zag pattern, or a smooth curved pattern, or any other pattern which provides the correct relationship between the main directional component of its active core path, and the intended direction of bending, which is perpendicular to the main direction of the active core paths. A fluid pressure is applied to the interface between the core and the surrounding embedding material, and the result is the opening of an internal network of channels, formed by the viscous peeling of the surrounding solid from the core material. The term viscous peeling is used in this disclosure to denote fluid propagation into the interface between two solids, at least one of which is deformable, and which are initially in contact with each other.

The system is constructed with the core offset from the center line of the thickness of the surround material, such that pressure driven viscous flow through the narrow channels formed between the core and its surround material, generates two types of deformation of the skin—an in-plane elongation and a curvature of the skin plane itself. The shape of the internal solid core element and its material, as well as the material of the encompassing solid and the pressure inducing injected fluid are chosen to achieve a desired integral structural rigidity. The structural rigidity arises from the two elements making up the flexible skin/plate: (i) the inner embedded core network, in the shape of a serpentine or other suitable geometry, and (ii) the outer surrounding base solid. Typically, the inner core is constructed of a rigid material, with the core geometry providing spring characteristics required of the skin, while the surround material is of lower rigidity, such that it can flex readily under the influence of the pressure applied in the micro-channels formed by the peeling effect. The rigidity is generally anisotropic due to the directionality of the embedded network.

In the field of aviation and the manufacture of aircraft flight support components, the presently described structures and methods have several advantages over the embedded fluid channel networks which are commonly used in soft actuators, and are the subject of U.S. Pat. No. 10,450,051 for "Solid-Liquid Composite Structures", having some common inventors with the present application. The manufacturing methods of the present devices enable the use of very small cross-section serpentine cores and thus enable minimization of the skin thickness. In addition, the peeling method by which a displacement flow is used to actuate the skin as opposed to a full cross-section base flow, enables use of relatively small fluid quantities to achieve the desired pressures. Both these features are of great advantage in aircraft structures, because of the saving in weight and the simplicity of construction.

Airfoils manufactured with these characteristics can have their shape changed by application of the appropriate fluid pressure, such as to provide a curved and lengthened trailing edge section to mimic a conventional airfoil, having the advantage of reduced drag for the same lifting capabilities when compared with conventional wing sections. Additionally, if the peeling conditions are such that the morphing can be done rapidly, the shape of the skin can be shaped in response to real time incidents, such that it becomes possible to control the airfoil in real time to react to and compensate for the effect of varying external conditions.

There is thus provided in accordance with an exemplary implementation of the devices described in this disclosure, an airfoil surface layer skin, comprising:
 (i) a base layer of a solid material having a predetermined flexibility,
 (ii) a network element comprising a solid core material having a higher rigidity than that of the base layer, the network element being embedded in the base layer with at least part of the network element at a depth offset from the center of the thickness of the base layer, and
 (iii) at least one fluid connector disposed such that pressurized fluid from the connector is applied to at least one point at an interface between the network element and the surrounding base layer, causing peeling of the base layer from the network element,
wherein the surface shape of an airfoil comprising the skin is changed on adjustment of the pressure of the fluid applied to the skin.

In such an airfoil surface layer skin, the change of shape may be generated by the anisotropic change in the flexibility of the skin by propagation of peeling along the network element. In any of the above mentioned skins, the change of shape may further be determined by at least one of the network geometry, the base layer geometry, the flexibility of the base layer, and the positioning of the network element within the base layer. Furthermore, the above mentioned anisotropic change in the flexibility of the skin may be generated by the configuration of the geometry of the network.

According to yet further implementations of the above described airfoil surface layer skins, the network element may have a serpentine form. Additionally, the network may have first segments having essentially parallel straight form, and shorter second segments connecting adjacent first segments. In that case, the first segments should be aligned in directions generally parallel to the axes around which the airfoil surface layer is intended to bend. Furthermore, the shorter second segments may connect the first segments at alternating ends of the first segments, such that the network element has an essentially serpentine form.

In even further examples of the above described airfoil surface layer skins, the interface between the network element and the surrounding base layer may comprise the common surface shared by the base layer and the network element. Additionally, the peeling of the base layer from the network element generates an internal channel between the base layer and the network element. In this implementation, the internal channel is created by the application of the pressurized fluid. Alternatively expressed, a separation between the base layer and network element is created when the pressurized fluid is applied.

In accordance with yet other implementations of the airfoil surface layer skins of the present disclosure, the change of shape of the airfoil surface layer may be adapted to change at least one of the airfoil camber, the airfoil chord, the airfoil thickness, or the spanwise wash of a lifting surface. Furthermore, the change of shape of the airfoil surface layer should provide the airfoil with a reduced drag coefficient compared with a similar airfoil having a conventional shape changing mechanism.

In another implementation, a time dependent adjustment of the pressure of the fluid applied to the skin is operative to generate time dependent deformations of the airfoil surface.

Additionally and alternately, the at least one fluid connector may comprises more than one fluid connector supplying pressurized fluid to more than one point along the network element interface with the base layer. Furthermore, the network element may comprise a number of separately actuated segments.

In any of the above described airfoil surface layer skins, the network element may be embedded in the base layer having a state of compression, such that when freed from the base layer by peeling of the base layer from the network element, the network element undergoes an expansion. In such a case, the expansion of the network element generates an extension of the airfoil.

There is also provided, according to further exemplary implementations described in this disclosure, a method of providing reduced drag to an airfoil, by constructing an airfoil using any of the surface layer skins described above, wherein the airfoil should have reduced drag compared with an equivalent airfoil whose shape is changed by use of mechanical elements to move sections of the airfoil. Use of such a method should result in an airfoil further having at least one of lower noise, better control authority and higher efficiency throughout the aircraft flight envelope.

BRIEF DESCRIPTION OF THE DRAWINGS

The present invention will be understood and appreciated more fully from the following detailed description, taken in conjunction with the drawings in which.

DETAILED DESCRIPTION

Figure 1:
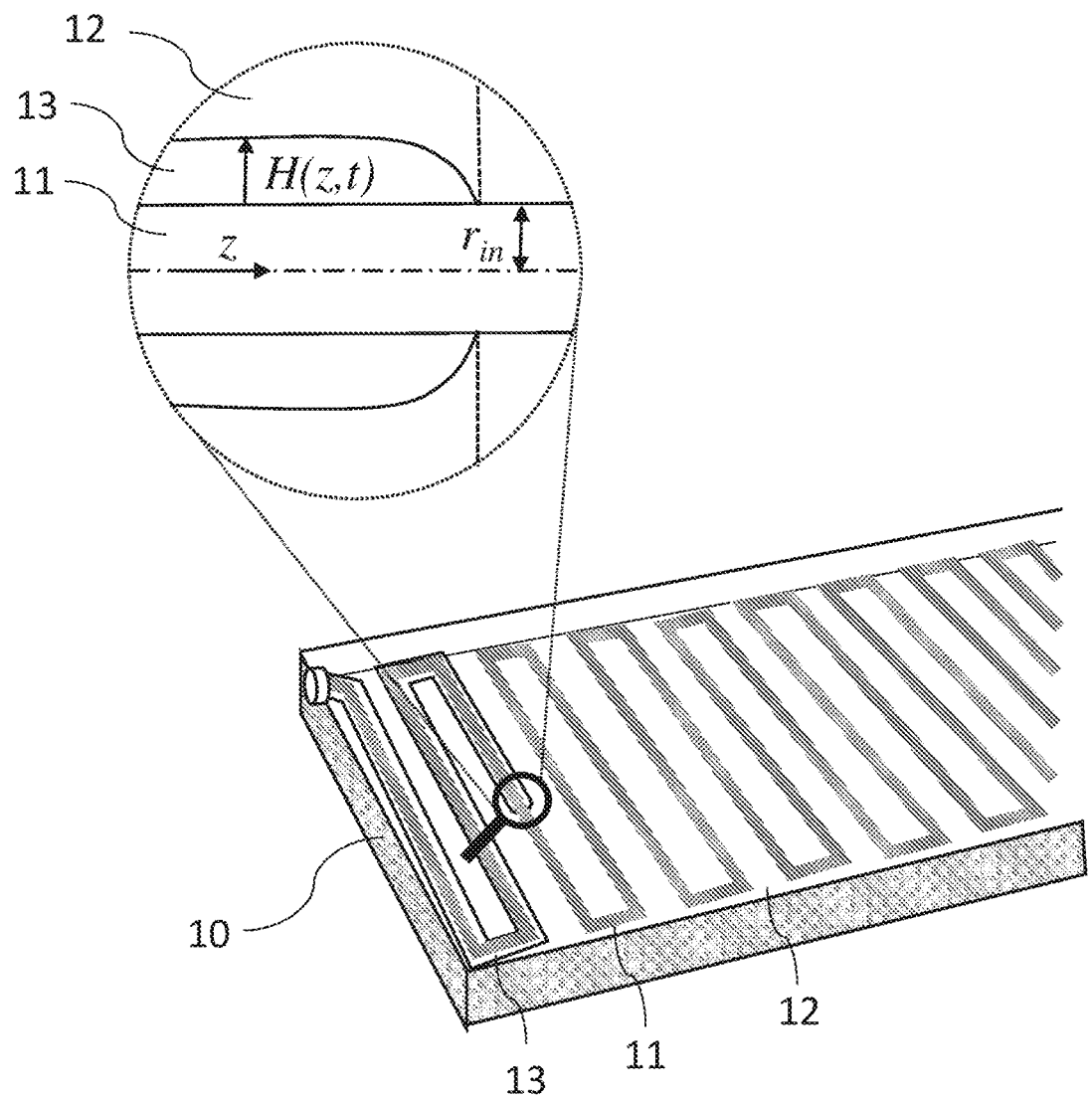
FIG. 1 illustrates schematically an example of a flexible thin composite plate section, according to the methods and materials of the present disclosure, suitable for use as the skin of an airfoil.

Reference is now made to FIG. 1, which illustrates schematically an example of a flexible thin composite plate section 10, suitable for use as the skin of an airfoil, enabling adjustment of the shape and length of the airfoil surfaces by applying the phenomenon of viscous peeling to the thin plate structure. The term viscous peeling is used to describe fluid propagation into the interface between two deformable solids that are initially in contact with each other. This disclosure describes the use of viscous peeling to create and move soft actuators, which can therefore be used for the adjustable flight surfaces of an aircraft.

The plate comprises two major components—a core made of a continuous network of thin solid rod 11, the network being embedded in an outer layer 12 of a material having a rigidity less than that of the rod material. The rod is typically constructed of a stiff polymer, such as ABS, or PVA fibers. In order to reduce the thickness of the skin, which is an important aim for use on an airfoil surface, the core may be made smaller by forming it of a metal, such as an aluminium alloy such as 7075, or of spring steel. The outer embedding layer is typically constructed of a more pliable polymer, such as PLA, or a silicone elastomer, such as Sylgard 184, supplied by the Dow Chemical Company. The embedded structure may be simply constructed by casting the pre-cured polymer around the core element, and curing of the polymer generates the completed plate. The core 11 is positioned asymmetrically to the neutral plane at the center line of the thickness axis of the plate, and is seen in FIG. 1 to be located closer to the upper surface of the plate than to the lower surface. In the example shown in FIG. 1, the core has the shape of a continuous serpentine network, but the exact form of the network can be selected to provide appropriate filling and coverage of the controlled surface, according to the propagation of the viscous peeling between the two components of the plate. Thus, parallel sections of the network may also be envisaged, providing different coverage to different regions of the airfoil. The thin solid rod making up the network most conveniently has a cylindrical cross section, but this is not a limiting characteristic, and other cross sectional shapes such as elliptic shapes, or figure-of-eight shapes may also be used. The rigidity of the skin structure is anisotropic, because of the directionality of the embedded network. In the example shown in FIG. 1, the skin plate is more flexible along the length of the plate shown, perpendicular to the long segments of the network, than across its width. This property will be used advantageously in using such a plate as the deformable surface skin of an airfoil, as described hereinbelow.

Fluid is forced into the interface between the thin inner rod structure 11 and the external surrounding embedding material 12, such that viscous peeling occurs between the inner rods and the surrounding base material, progressing from the point of application of the pressure, down the network, thereby creating an internal network of very thin fluid-filled channels, and if the shape of the network is so planned, chambers may also be formed. Since these microchannels are positioned off-axis to the neutral plane, pressurization of the microchannel network creates a local moment, and a deflection of the plate is generated. By this means, the off-axis, embedded fluidic network of fluid filled channels, function in a similar manner to those formed in the physically distinct channel structures shown in the above referenced U.S. Pat. No. 10,450,051. However, the important difference is that in the presently described configuration, the deflection can be achieved without the need to create an internal network of physically fixed channels within the plate. This difference is of fundamental importance, since the present configuration of using viscous peeling, enables very thin deformable plates to be produced, thereby enabling them to be used as skins for the airfoil structure. Deformable skins having thicknesses down to 3 mm. or so, can be produced, this being only slightly more than currently used inert covering skins of airborne structures.

The gap formed between the two components is a function of the applied peeling pressure, and of the rigidity of the embedding material, such that the extent of bending induced into the composite plate can be controlled, both in extent and in time by control of the applied pressure. Another advantage of this aspect of the viscous peeling mechanism as compared with prior art methods of using discrete preformed channels, as in previously mentioned U.S. Pat. No. 10,450,051, arises from this feature that the displacement of the channel or the extent of penetration of the fluid pressure into the peeling-generated channel is confined to a distinct region, beyond which there is no displacement. This enables a higher degree of control of the actuator since its length of effect can essentially be defined at every point in time. Thus, multiple deformation modes in a single structure can be achieved by a single geometrical configuration. This mechanism is due to the nonlinearity of the peeling wave.

Furthermore, the use of small, cross-sectional serpentine networks enables minimization of the skin thickness. In addition, the micro-size of the peeling channels formed as the pressure is increased, enables use of very small fluid quantities to achieve the desired pressures, thereby saving valuable space and weight, not only of the fluid itself, but also for the mechanisms for compressing the fluid.

In FIG. 1, the point to which the propagating microchannel generated by the peeling has reached, is shown by a magnifying glass shape, the magnified view of which is shown in the circle at the top of the drawing of FIG. 1. In that magnified view, the core 11 is shown having a radius $r_{in}$, and is surrounded by the pliant embedding medium 12. The generated channel of fluid 13, has reached a point z along the Z-axis of a core rod, which is dependent on the time t from the application of the peeling pressure.

Figure 2A:
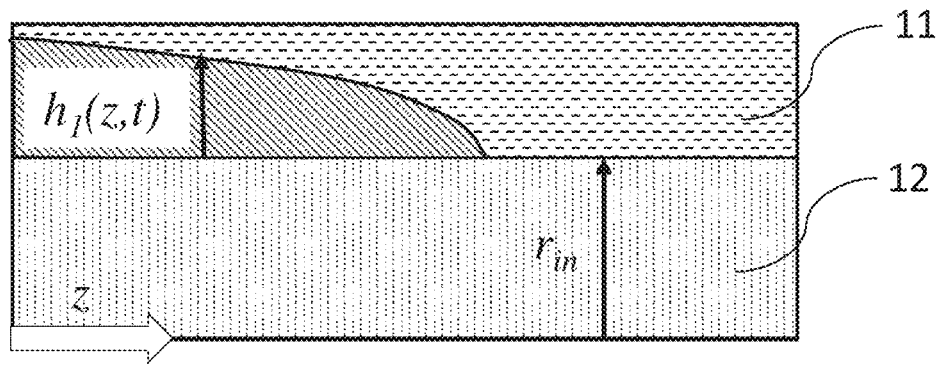
FIGS. 2A to 2C show in greater detail the manner in which the fluid channels of the flexible plate section of FIG. 1 are generated and propagate.
Figure 2B:
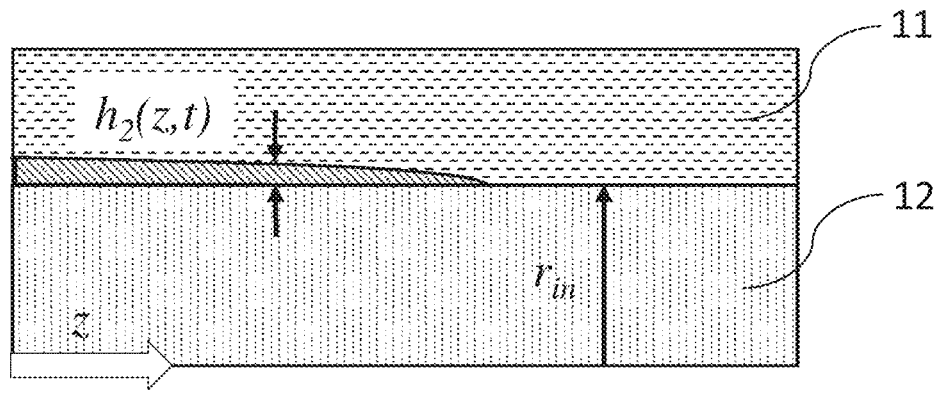

Reference is now made to FIGS. 2A and 2B, which show in greater detail the manner in which the fluid channels are generated and propagate. In the first application after production of the skin element, as shown in FIG. 2A, a higher pressure is required in order to separate the two skin components, since they may have become adhesively attached during the casting procedure. For that reason, the dimension $h_1(z,t)$ of the generated channel beyond the radius of the core element is substantially larger than the dimension $h_2(z,t)$ of the generated channel resulting from regular use after the initial sticking of the core to the embedding material has been broken. This is shown in FIG. 2B.

Figure 2C:
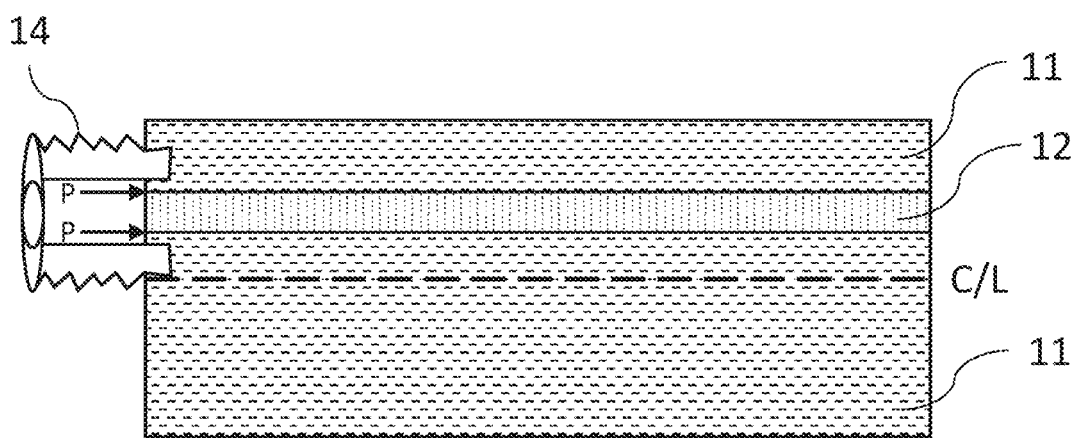

In FIG. 2C, there is shown schematically how the pressure is applied to the interface between the core 11 and outer elastic embedding medium 12, of the thin composite plate section shown in FIG. 1, in order to generate the peeling effect. A connector 14 is attached to the embedding medium 12, such as by casting the embedding medium with the connector in place, with the result that the connector is rigidly cast into the skin plate. The connector is positioned such that its pressure aperture covers the full diameter of the core rod 11, thereby applying pressure P to the interface between the core rod and the embedding elastic medium, this pressure causing the peeling effect. Alternative methods exist for applying the fluid pressure to the interface between the core material and the embedding surround material. For instance, the end face of the plate section could comprise a chamber, which could, for instance, cover the ends of several separate networks of cores, and the pressure applied by means of the connector to the entire chamber. Another alternative could be for the pressurized fluid to be applied to a surface of the core rod by a thin passageway through the surround material from the top or side of the plate, rather than from the end of the plate. All of these alternatives, though not shown in the exemplary drawing, are intended to be alternative methods of applying the pressure to the interface to implement the viscous peeling effect.

The thin flexible plates described in the previous drawings, thus have a number of properties which make them suitable for use as a deformable skin for serving as the surface covering of airfoils of an aircraft, which can change shape by changing the pressure applied to the network laid within the skin. The skin can be made thin, typically down to a thickness of the order of 3 mm, and if used to cover an element such as a wing, it is able to change the shape of the wing without requiring weighty and complex mechanical actuating mechanisms, such as are currently used in movable airfoil surfaces. Furthermore, because the fluid channels generated by the peeling effect are so small, and the quantity of fluid required to actuate deformation of the skin is thus also small, the pressure generating system for pressurizing the channels is also light weight. Thus, a light fluid compressor activating the presently described surface skins, is able to substitute the complex and substantially heavier mechanical components necessary to implement changes of shape in current conventional airfoils.

A further property of the elements described above, is that besides deforming on application of the actuating pressure, they also lengthen. This effect is achieved because of the spring nature of the serpentine network used in these flexible plate structures. As the applied propagating pressure generates bending of the plate, it also releases any precompression of the spring structure of the serpentine network, allowing the network to expand in the direction perpendicular to the long elements of the network. All of the above mentioned properties can be directly applied to the construction of a wing, or other supporting airfoil, which is able to change its shape and size as required by the operating characteristics of the wing or other airfoil.

Figure 3:
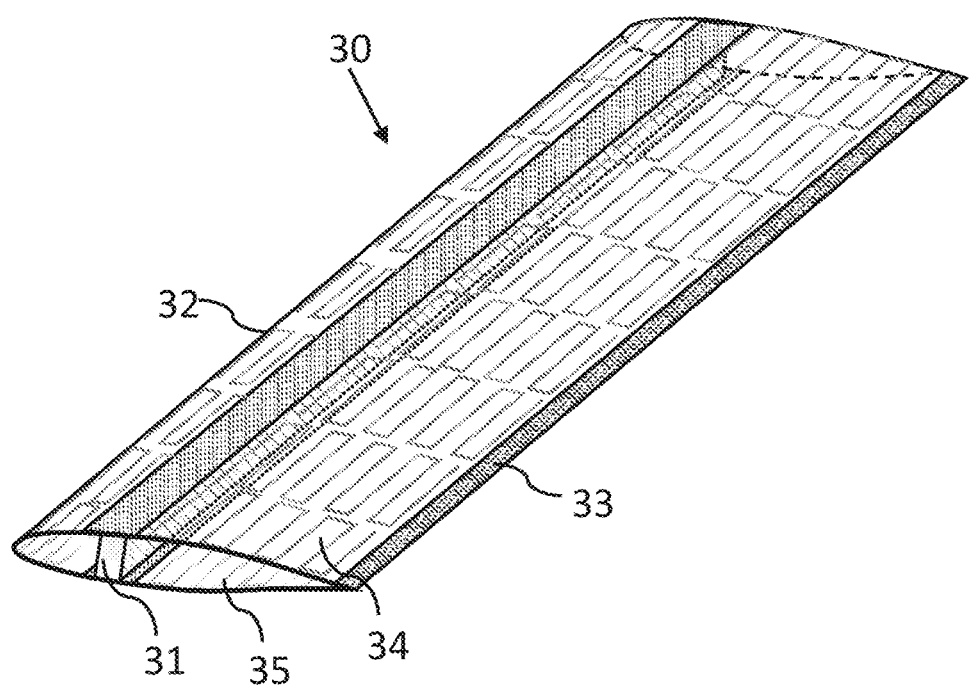
FIG. 3 illustrates schematically an aircraft wing, constructed using the dynamic skin construction described in this disclosure.

Reference is now made to FIG. 3, which illustrates schematically an aircraft wing 30 constructed using the dynamic skin construction described in this disclosure. The wing is built around an I-beam 31, which supplies the structural support of the entire wing, and by means of which it is attached to the fuselage, though it is to be understood that this is only one method of wing support, and other conventional planform support techniques may also be used. The plane of this beam is defined as the reference plane relative to which, the angles and positions of the wing surfaces and of the leading edge section 32 and trailing edge section 33, are referred. The surfaces of the wing are made up of deformable skins, constructed and operative as described in this disclosure. In order to provide sufficient strength for the wing, the embedded network is typically made of aluminum alloy, situated with high precision within a thin-walled surrounding covering layer, having flexibility, yet resistance to external damage, such as from the impact of small objects during flight. The surrounding layer is typically made of a high strength castable polymer to provide ease of manufacture. Other alternatives could be for material having more resistance to damage, such as another, and softer, aluminium alloy, or a composite material of a matrix and resin binder. Yet another possibility is to use a sandwich construction, made of a polymer with a thin sheet of a metal such as an aluminium alloy on the outside covering the polymer, to provide additional wear and damage resistance. In the drawing of FIG. 3, these skins are used for both top 34 and bottom 35 surfaces of the wing, and also for the leading edge surfaces, forward of the I-beam support element. The wing is shown in FIG. 3 as having a symmetric wing planform.

Figure 4:
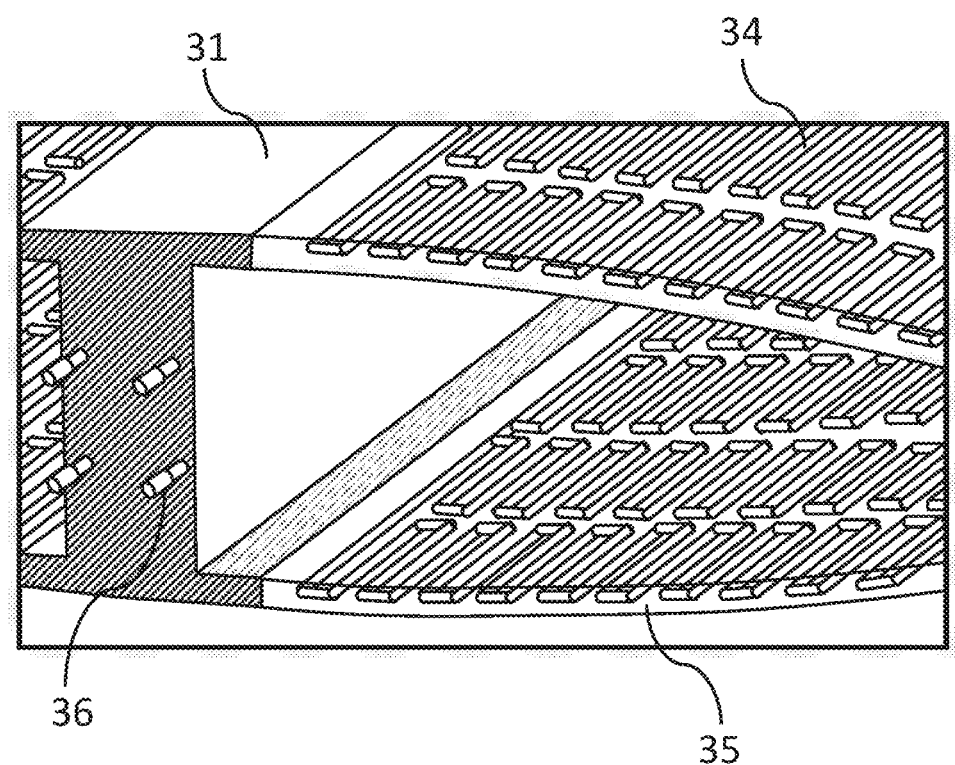
FIG. 4 shows a close-up view of the wing section of FIG. 3, in the region of the support beam.

Reference is now made to FIG. 4, which shows a close up view of the wing section of FIG. 3, in the region of the support I-beam 31, showing the embedded peeling networks in the top 34 and bottom 35 wing surface skins, positioned asymmetrically relative to the neutral plane at the center line of the skin thickness. In addition, connection pipes 36 are shown, for supplying the pressurized fluid to the embedded network to activate the skins. Although that part of the network element shown in FIG. 4 is a continuous chain, it is to be understood that the exact network configuration can be amended by dividing up the complete network into several separately pressurized segments, to enable more rapid propagation of the peeling effect and hence more rapid application of the bending forces to the skin. Upper and lower cambers may be separately controlled by these pressure inputs, and different regions along the span of the wing may be separately controlled, such as the different functions of the ailerons and the flaps of a conventional wing. The pressurizing fluid may be air or oil or any other suitable fluid. Pressure input for a wing of size suitable for a large UAV or small manned aircraft may vary between 1-4 bar and enables control of camber as well as extension of the wing. The required pressure is generally the output of a complex mechanical problem—external aerodynamic forces, internal structure and elastic properties. Neglecting external effects, the more rigid the internal structure, the higher the required pressure. The rigidity is a function of the external forces which the wing or other component is required to withstand, which, of course, depends on the aircraft for which the wing is designed. Thus, the pressures required depend on wing size and are also a function of the structural characteristics of internal wing build. The level of pressures required is generally substantially less than the hydraulic pressures required for mechanical adjustment of hinged flaps, thus illustrating one of the incidental advantages of the presently disclosed systems, namely that the hydraulic systems can be much lighter and simpler than those of conventional wings.

Generally, the wing will be actuated asymmetrically to form a positive camber, such as would be used to generate flap profiles. This is shown in FIG. 5, which is a cross sectional view of the wing shown in FIGS. 3 and 4, with its skins activated to provide positive camber to the wing surfaces, and extension of the trailing edge section to emulate flap performance and generate additional lift.

Figure 5:
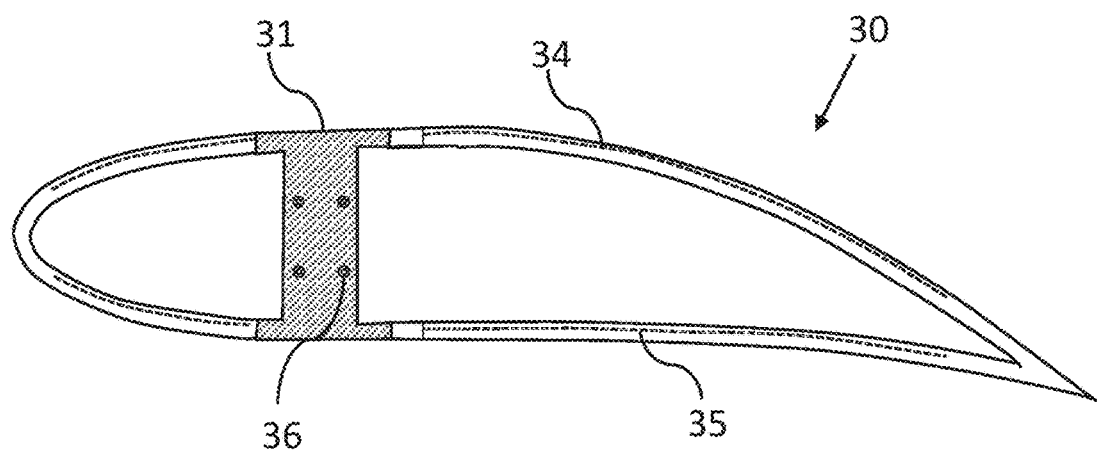
FIG. 5 is a cross sectional view of the wing shown in FIGS. 3 and 4, with its skins activated to provide positive camber to the wing surfaces, and extension of the trailing edge section to emulate flap performance and generate additional lift.
Figure 6:
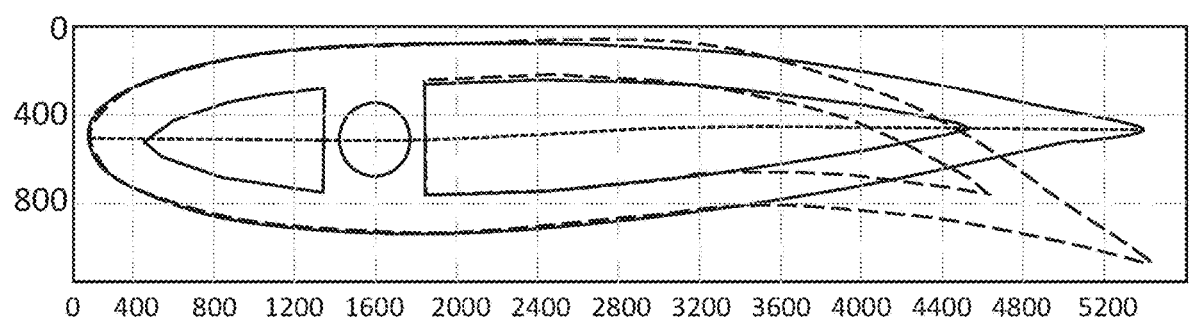
FIG. 6 which shows the results of a computer simulation of a wing similar to that shown in FIGS. 3 to 5, showing the symmetric camber wing shape and the fully extended trailing section of the wing.

Reference is now made to FIG. 6 which shows the results of a computer simulation of a wing similar to that shown in FIGS. 3 to 5, showing the symmetric camber wing shape in solid line and the fully extended trailing section of the wing in dashed outline. The simulation emulates a 30% chord flap deflection geared towards minimizing section pitching moment, extending angle of attack range and elevating maximum section lift. Additionally, adaptive camber control for steady flight conditions can be simulated, in order to show how pressure application varied in time according to flight characteristic inputs, can be usefully generated for providing steady flight conditions. Such an application requires knowledge of the dynamic characteristics of the propagation of the peeling effect down the length of each segment of the core network. The further down the network the peeling is propagated, as shown schematically in FIG. 1, the larger the extent of the deflection produced, such that to accurately compensate for rapid flight characteristic variation, a fast transient response pressure system must be used, and the properties of the peeling propagation must also be capable of execution sufficiently fast.

Figure 7:
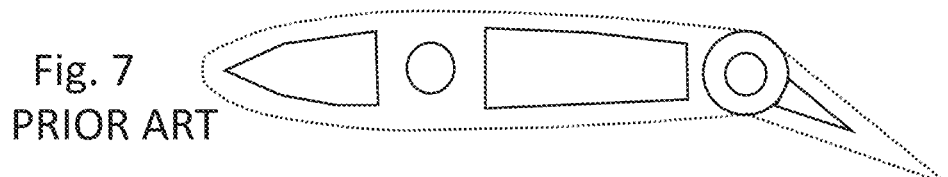
FIG. 7 illustrates schematically a conventional airfoil section with a specific span, chord and shape.
Figure 8:
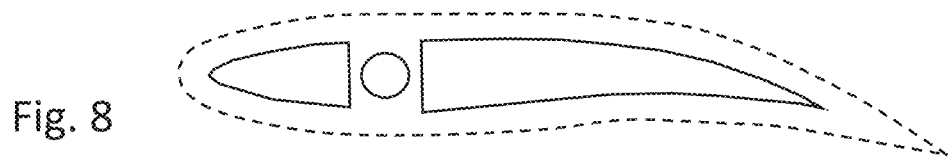
FIG. 8 shows a section across an airfoil, of the same shape and size as the conventional airfoil of FIG. 7, but constructed using the embedded network morphing technology described in FIGS. 1 to 6.
Figure 9:
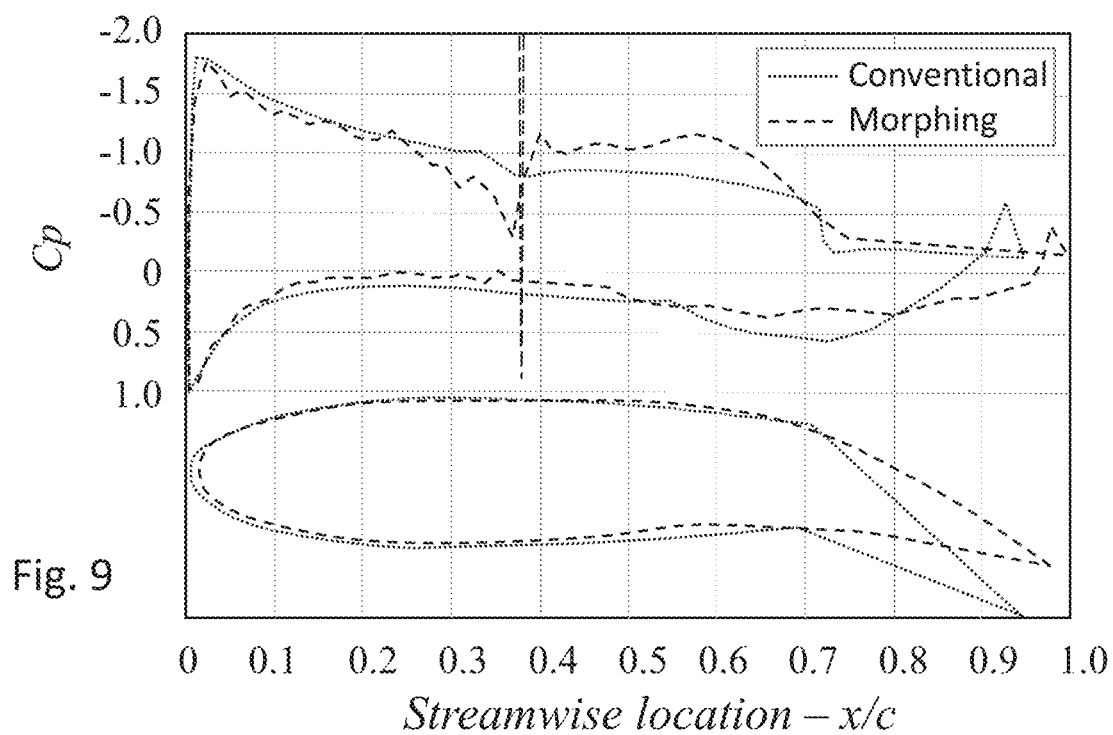
FIG. 9 is graphical representations of the calculated pressure coefficient distribution of the upper and lower cambers of the conventional airfoil of FIG. 7 compared with the corresponding embedded network morphing airfoil of FIG. 8.

Reference is now made to FIGS. 7, 8 and 9, which illustrate the capabilities of a wing constructed using the morphing skins using the peeling-based embedded networks described in this disclosure. FIG. 7 illustrates schematically a conventional airfoil section with a specific span, chord and shape. This airfoil uses a standard flap configuration to modify aerodynamic forces. The calculated lift coefficient Cl was 1.04, while the drag coefficient was calculated as 0.0572

Reference is now made to FIG. 8 which shows a section across an airfoil, of the same shape and size as the conventional airfoil of FIG. 7, but constructed using the embedded network morphing technology described in this disclosure. It is actuated to emulate a constant streamlined flap deflection at 30% chord. The calculated lift coefficient Cl was 1.04, while the drag coefficient was calculated as 0.0405

FIG. 9 shows graphical representations of the calculated pressure coefficient distribution of the upper and lower cambers of the conventional airfoil of FIG. 7 (fine dotted lines), and the corresponding embedded network morphing airfoil of FIG. 8 (dashed lines), both operating at zero incidence and a Reynolds number of Re=$0.5 \cdot 10^6$. The aerodynamic force coefficient calculations were performed using the Xfoil programme. This comparison of the performances shows that the conventional airfoil requires a 34° flap deflection to achieve the same lift force increment, ($\Delta C_l \approx 1$@AOA=0) as the morphing airfoil. While the pressure distribution of the two airfoils is roughly the same, the conventional model has a sharp discontinuity in its camber, at the flap joint. In this particular comparison, the resulting drag force for the morphing model of the present disclosure is reduced from that for the conventional model by 30%, $\Delta C_d = (C_{d,morphing} - C_{d,conv})/C_{d,conv} = -30\%$, where $C_d$ is the drag coefficient and $C_l$ is the lift coefficient. The calculated lift coefficient $C_l$ for the conventional model of FIG. 7 is 1.04, while the drag coefficient $C_d$ is calculated as 0.0572. For the morphing model of the present disclosure, shown in FIG. 8, the lift coefficient $C_l$ is 1.04, while the drag coefficient $C_d$ is calculated as 0.0405, a reduction of 30%. Thus, the elimination of the sharp surface discontinuity in the conventional flap airfoil, and its replacement with a smoothly varying profile, has a substantial effect in reducing the drag of the airfoil. This advantage is in addition to the ability of the presently described morphing airfoil to perform dynamic functions such as steady-state cancelation of section pitching moment, or dynamic flow control over the airfoil.

Figure 10:
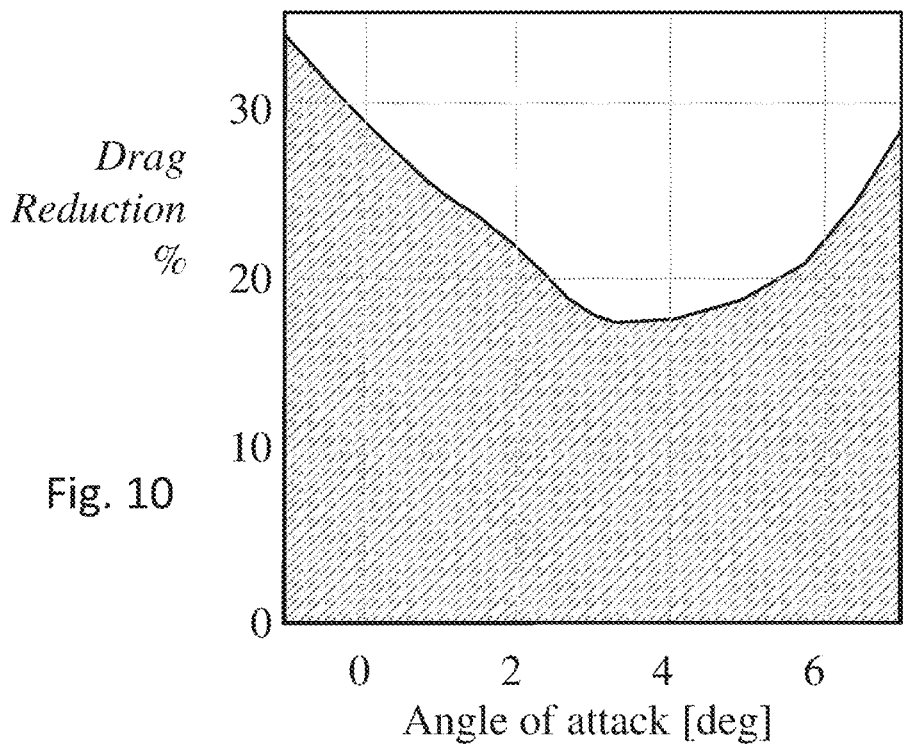
FIG. 10 is a plot of the calculated drag reduction for the airfoil of FIG. 8, over the drag calculated for the conventional airfoil of FIG. 7, as a function of angle of attack (AOA)
Figure 11:
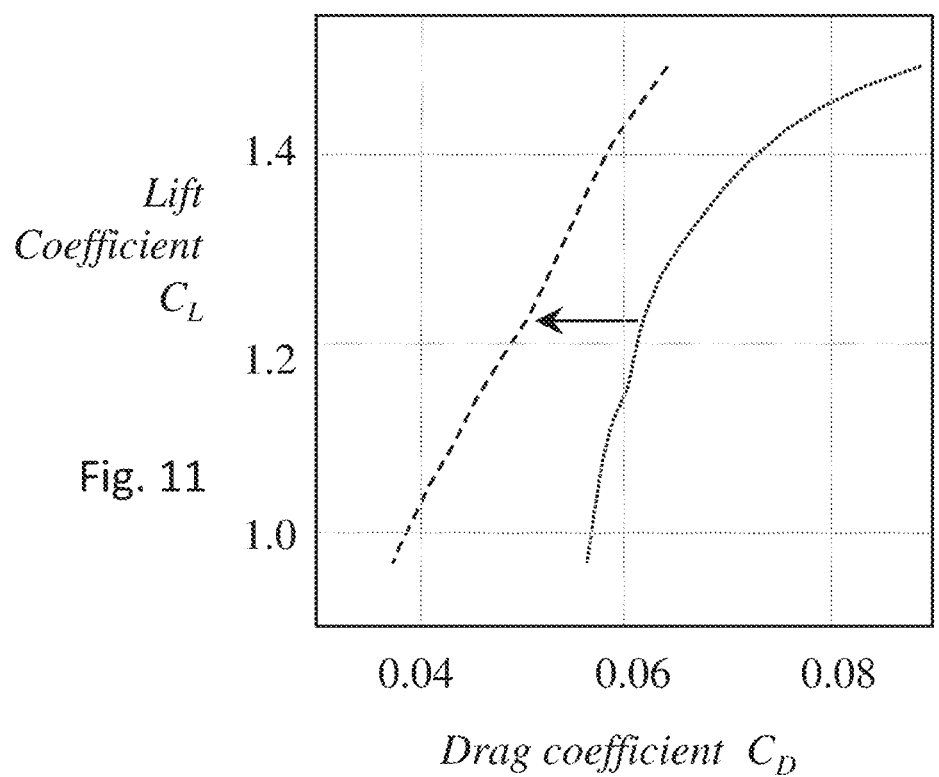
FIG. 11 is a plot of the drag polar lift coefficient versus the drag coefficient, for the two above compared airfoils.

Reference is now made to FIGS. 10 and 11, which illustrate graphically the overall performance of airfoils using the embedded network morphing skins of the present disclosure, in comparison with a conventional airfoil, by examining a range of angles of attack and lift coefficients. These varying conditions are required, for example, when an aircraft changes its vertical state, such as in takeoff/landing, climbing, and cruising.

FIG. 10 is a plot of the calculated drag reduction for the airfoil of FIG. 8, using the presently described morphing skin technology, over the drag calculated for the conventional airfoil of FIG. 7, as a function of angle of attack (AOA), both being for a Reynolds number of $0.5 \times 10^6$. For the described airfoil shapes, the use of the presently described technology can reduce drag by a factor of 18% to 30% when compared with conventional flap operation.

FIG. 11 is a plot of the drag polar $C_l$ versus $C_d$, for the two compared airfoils. While the conventional flapped airfoil typically operates within increased drag segments of the polar, the working regimes of the morphing skin airfoils of the present applications, are within the lower, streamlined section of the polar.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. An airfoil comprising:
a surface layer skin;
a base layer of a solid material having a predetermined flexibility, wherein the base layer is embedded within the surface layer skin;
a network comprising a solid core material having a higher rigidity than that of the base layer, the network being embedded in the base layer with at least part of the network at a depth offset from the center of the thickness of the base layer; and
at least one fluid connector disposed such that pressurized fluid from the connector is applied to at least one point at an interface between the network and the surrounding base layer, causing peeling of the base layer from the network;
wherein the surface shape of an airfoil comprising the surface layer skin is changed on adjustment of the pressure of the fluid applied to the surface layer skin.

2. The airfoil according to claim 1, wherein the change of shape is generated by the anisotropic change in the flexibility of the surface layer skin by propagation of peeling along the network.

3. The airfoil according to claim 1, wherein the change of shape is further determined by at least one of geometry of the network, base layer geometry, the flexibility of the base layer; and positioning of the network within the base layer.

4. The airfoil according to claim 2, wherein the geometry of the network is configured to generate the anisotropic change in the flexibility of the surface layer skin.

5. The airfoil according to claim 1, wherein the network has a serpentine form.

6. The airfoil according to claim 1, wherein the network has first segments having essentially parallel straight form, and shorter second segments connecting adjacent first segments.

7. The airfoil according to claim 6, wherein the first segments are aligned in directions generally parallel to the axes around which the airfoil surface layer is intended to bend, or wherein the shorter second segments connect the first segments at alternating ends of the first segments, such that the network has an essentially serpentine form.

8. The airfoil according to claim 1, wherein the interface between the network and the surrounding base layer comprises a common surface shared by the base layer and the network.

9. The airfoil according to claim 1, wherein the peeling of the base layer from the network creates an internal channel between the base layer and the network.

10. The airfoil according to claim 9, wherein the channel is created by the application of the pressurized fluid.

11. The airfoil according to claim 1, wherein a separation between the base layer and network is created when the pressurized fluid is applied.

12. The airfoil according to claim 1, wherein the change of shape of the airfoil surface layer is adapted to change at least one of the airfoil camber, the airfoil chord, the airfoil thickness, or the spanwise wash of a lifting surface.

13. The airfoil according to claim 1, wherein the change of shape of the airfoil surface layer provides the airfoil with a reduced drag coefficient compared with a similar airfoil having a conventional shape changing mechanism.

14. The airfoil according to claim 1, wherein a time dependent adjustment of the pressure of the fluid applied to the surface layer skin is operative to generate time dependent deformations of the airfoil surface.

15. The airfoil according to claim 1, wherein the at least one fluid connector comprises more than one fluid connector supplying pressurized fluid to more than one point along the network interface with the base layer.

16. The airfoil according to claim 1, wherein the network comprises a number of separately actuated segments.

17. The airfoil according claim 1, wherein the network is embedded in the base layer having a state of compression, such that when freed from the base layer by peeling of the base layer from the network, the network undergoes an expansion.

18. The airfoil according to claim 17, wherein the expansion of the network generates an extension of the airfoil.

19. A method of providing reduced drag to an airfoil, by constructing an airfoil according to claim 1, the airfoil having reduced drag compared with an equivalent airfoil whose shape is changed by use of mechanical elements to move sections of the airfoil.

20. The method of claim 19, wherein the airfoil further has at least one of better control authority and higher efficiency throughout a flight envelope of an aircraft incorporating the airfoil compared with an equivalent airfoil whose shape is changed by use of mechanical elements to move sections of the airfoil.

* * * * *